(12) United States Patent
Yoo et al.

(10) Patent No.: US 8,129,458 B2
(45) Date of Patent: Mar. 6, 2012

(54) FUNCTIONAL REINFORCING FILLER AND METHOD OF PREPARING THE SAME

(75) Inventors: Bok Ryul Yoo, Seoul (KR); Joon Soo Han, Gyeonggi-Do (KR); Dong Euy Jung, Seoul (KR); Janghyun Yoo, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 39 days.

(21) Appl. No.: 12/704,359

(22) Filed: Feb. 11, 2010

(65) Prior Publication Data

US 2011/0098389 A1     Apr. 28, 2011

(30) Foreign Application Priority Data

Oct. 28, 2009  (KR) .................. 10-2009-0103040

(51) Int. Cl.
*B60C 1/00* (2006.01)
*B32B 25/00* (2006.01)
(52) U.S. Cl. .............. 524/261; 428/405; 427/384
(58) Field of Classification Search .............. None
See application file for complete search history.

(56) References Cited

U.S. PATENT DOCUMENTS

| | | | | |
|---|---|---|---|---|
| 3,768,537 A * | 10/1973 | Hess et al. | ............... | 152/209.5 |
| 4,201,698 A * | 5/1980 | Itoh et al. | ............... | 524/83 |
| 4,390,648 A * | 6/1983 | Stacy | ............... | 523/216 |
| 5,227,425 A | 7/1993 | Rauline | | |
| 5,494,955 A * | 2/1996 | Swor et al. | ............... | 524/496 |
| 5,852,097 A * | 12/1998 | Kikuchi | ............... | 524/492 |
| 5,871,846 A * | 2/1999 | Freeman et al. | ............... | 428/405 |
| 6,140,393 A * | 10/2000 | Bomal et al. | ............... | 523/213 |
| 6,774,255 B1 * | 8/2004 | Tardivat et al. | ............... | 556/427 |
| 6,822,036 B1 * | 11/2004 | Gorl et al. | ............... | 524/492 |
| 2002/0143096 A1 * | 10/2002 | Amaddeo et al. | ............... | 524/493 |
| 2003/0114601 A1 * | 6/2003 | Cruse et al. | ............... | 525/332.6 |
| 2004/0051210 A1 * | 3/2004 | Tardivat et al. | ............... | 264/349 |
| 2004/0198881 A1 * | 10/2004 | Cruse et al. | ............... | 524/261 |

FOREIGN PATENT DOCUMENTS

EP      0501227 A1    2/1992

OTHER PUBLICATIONS

S.Wolff, Wesseling, Reinforcing and Vulcanization Effects of Silane Si 69 in Silica-Filled Compounds, Kautschuk +Gummi— Kunststoffe 34. Jahrgang, NR. Apr. 1981, pp. 280-284.

* cited by examiner

*Primary Examiner* — Robert Loewe
(74) *Attorney, Agent, or Firm* — Lowe Hauptman Ham & Berner, LLP

(57) ABSTRACT

Provided are a functional reinforcing filler and a method of preparing the same, and more particularly, a functional reinforcing filler including inorganic particles having a surface modified by an organic silanepolyol obtained by hydrolyzing an organic alkoxysilane compound and a method of preparing the sane. The functional reinforcing filler has hydrophobicity and reactivity. If the functional reinforcing filler is used to prepare rubber, a coupling agent is not required, and the rubber does not emit volatile organic compounds (VOCs). In particular, a tire prepared using the functional reinforcing filler may have low rolling resistance and excellent wet traction.

19 Claims, 5 Drawing Sheets

FUNCTIONAL REINFORCING FILLER AND METHOD OF PREPARING THE SAME

CROSS-REFERENCE TO RELATED APPLICATION

This application claims under 35 U.S.C. §119(a) the benefit of Korean Patent Application No. 10-2009-0103040 filed Oct. 28, 2009, the entire contents of which are incorporated herein by reference.

BACKGROUND OF THE INVENTION

1. Field of the Invention

The present invention relates to a functional reinforcing filler including inorganic particles having a surface modified by an organic silanepolyol obtained by hydrolyzing an organic alkoxy silane compound and a method of preparing the same.

2. Description of the Related Art

In the production of tires, it is common to use various additives to improve the physical properties of an organic polymer. In particular, silica has been widely used in recent years as a reinforcing filler in rubber used to produce tires. A rubber composition including silica may improve tensile strength, tear resistance and abrasion resistance of tires, and may also reduce rolling resistance and improve wet traction. However, a silica filler, as a sole reinforcing filler, may not be well dispersed in rubber and coupled in the rubber due to hydrophilic groups on the surface thereof, so as not to improve physical properties of rubber. In order to overcome this problem, a variety of silane coupling agents have been used with the silica filler.

In order to use a silane coupling agent, a silane coupling agent may be added to a rubber composition, or the surface of a silica filler may be modified using a silane coupling agent. For this, an organic alkoxy silane containing sulfur such as mercaptoalkyltrialkoxysilane and bis(alkoxysilylalkyl)polysulfide has been used in the tire industry.

When a mercaptoalkyltrialkoxysilane coupling agent is used with silica, physical properties of the rubber may be improved. However, the mercaptoalkyltrialkoxysilane coupling agent causes irritating odors, and time and energy to mix them with a polymer composition increase, processibility of the rubber may be reduced due to too short prevulcanization time.

In the early 1990's, green tire using bis(triethoxysilylpropyl)tetrasulfide (TESPT) was reported by Michelin Tire Corp. [Eur. Patent EP0501227, U.S. Pat. No. 5,227,425]. Since then, TESPT has been widely used to crosslink and cure silica and a synthesis rubber in tires. However, the preparation of rubber using a silica filler and TESPT needs to be performed within a narrow temperature range. The temperature for mixing silica and rubber should be high enough to permit the reaction between silica and an alkoxy silane coupling agent to take place rapidly, since an alkoxy group of the alkoxy silane coupling agent reacts with a hydroxyl group (—OH) of silica at a very high temperature. However, when using TESPT, irreversible thermal degradation of a polysulfane functional group and prevulcanization of a rubber mixture are inevitable at a high temperature. On the other hand, at a low temperature, alkoxy silane is too slowly hydrolyzed, so that unreacted alkoxy groups remain and can be available to further hydrolysis to generate alcohol during subsequent stages while mixing the rubber composition. The alcohol remaining around the rubber matrix is emitted to cause environmental problems. This may form pores or bubbles on the surface of rubber products, thereby causing defects on tire treads. In addition, it is known that TESPT cannot be completely hydrolyzed.

Wolff, S reported that up to ⅔ of alkoxy groups can be hydrolyzed due to steric hindrance of TESPT [Wolff, S. *Kautsch. Cummi, Kunstst* 1981, 34, 280]. The hydrolysis of unreacted alkoxy groups can continue through the life of a product manufactured from an elastomer compound to cause volatile organic compounds. In addition, due to incomplete hydrolysis, the TESPT is less coupled to silica.

Therefore, diverse research is being conducted into a modified silica or a rubber composition having minimized alkoxy groups by complete hydrolysis of an organic silane coupling agent.

SUMMARY OF THE INVENTION

To solve these problems, the present inventors have found a functional reinforcing filler having hydrophobicity and reactivity by treating the surface of inorganic particles such as silica using an organic silanepolyol instead of an alkoxy silane coupling agent. That is, the present invention provides a functional reinforcing filler and a method of preparing the same.

According to an aspect of the present invention, there is provided a functional reinforcing filler comprising inorganic particles having a surface modified by an organic silanepolyol obtained by hydrolyzing an organic alkoxy silane compound represented by Formula 1 below;

$$A\text{-}R^1\text{—}S_n\text{—}B \qquad (1)$$

wherein A is or —Si(X$^1$)$_2$X$^2$, —SiX$^1$(X$^2$)$_2$ or —SiX$^2$$_3$, wherein X$^1$ is a C$_1$-C$_{18}$ alkyl or an aryl group and X$^2$ is a C$_1$-C$_6$ alkoxy group, a C$_5$-C$_7$ cycloalkoxy group or a phenoxy group, R$^1$ is a C$_1$-C$_{18}$ alkylene or cyclic hydrocarbon, n is an integer from 1 to 8, and B is a hydrogen atom or —R$^1$-A.

According to another aspect of the present invention, there is provided a method of preparing a functional reinforcing filler, the method comprising: a first operation of preparing an organic silanepolyol-containing solution by hydrolyzing an organic alkoxy silane compound represented by Formula 1 below; a second operation of preparing a suspension by mixing the organic silanepolyol-containing solution and inorganic particles in the presence of at least one solvent selected from the group consisting of alcohol and water; a third operation of preparing inorganic particles coated with a molecular film by removing the alcohol and water from the suspension by evaporation; and a fourth operation of performing dehydration-condensation of the inorganic particles coated with the molecular film by heat-treatment.

According to another aspect of the present invention, there is provided a method of preparing a functional reinforcing filler, the method comprising: preparing a suspension by mixing an organic alkoxy silane compound represented by Formula 1 below, inorganic particles and an alcohol aqueous solution at an acidic condition, removing alcohol and water from the suspension by evaporation, and performing dehydration-condensation to modify the surface of the inorganic particles by heat-treatment,

$$A\text{-}R^1\text{—}S_n\text{—}B \qquad (1)$$

wherein A is —Si(X$^1$)$_2$X$^2$, —SiX$^1$(X$^2$)$_2$ or —SiX$^2$$_3$, wherein X$^1$ is a C$_1$-C$_{18}$ alkyl or an aryl group and X$^2$ is a C$_1$-C$_6$ alkoxy group, a C$_5$-C$_7$ cycloalkoxy group or a phenoxy group, R$^1$ is a C$_1$-C$_{18}$ alkylene or cyclic hydrocarbon, n is an integer from 1 to 8, and B is a hydrogen atom or —R$^1$-A.

According to another aspect of the present invention, there is provided a rubber composition including the functional reinforcing filler.

EFFECT OF THE INVENTION

The functional reinforcing filler according to the present invention has hydrophobicity and reactivity. If the functional reinforcing filler is used to prepare rubber, a coupling agent is not required, and the rubber does not emit volatile organic compounds (VOCs). In particular, a tire prepared using the functional reinforcing filler may have low rolling resistance and excellent wet traction.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
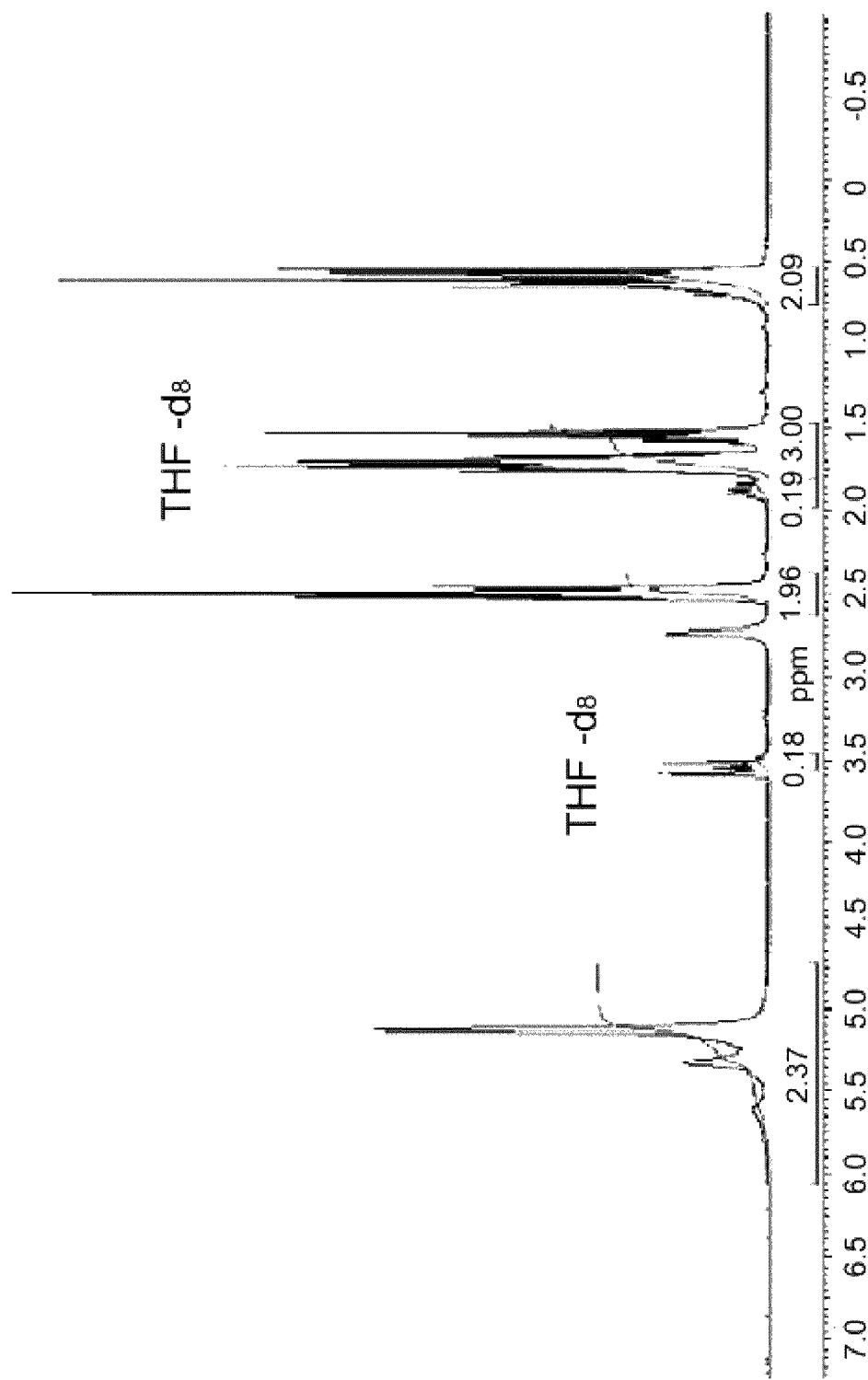
FIG. 1 shows $^1$H NMR spectrum of a solution containing mercaptopropyltrisilanol produced by hydrolyzing mercaptopropyltrimethoxysilane according to Example 1-(1)

The present invention will now be described more fully with reference to the accompanying drawings, in which exemplary embodiments of the invention are shown.

The present invention relates to a functional reinforcing filler including inorganic particles having a surface modified by an organic silanepolyol obtained by hydrolyzing an organic alkoxy silane compound represented by Formula 1 below;

$$A\text{-}R^1\text{—}S_n\text{—}B \quad (1)$$

wherein A is $\text{—Si}(X^1)_2X^2$, $\text{—SiX}^1(X^2)_2$ or $\text{—SiX}^2{}_3$, wherein $X^1$ is a $C_1\text{-}C_{18}$ alkyl or an aryl group and $X^2$ is a $C_1\text{-}C_6$ alkoxy group, a $C_5\text{-}C_7$ cycloalkoxy group or a phenoxy group, $R^1$ is a $C_1\text{-}C_{18}$ alkylene or cyclic hydrocarbon, n is an integer from 1 to 8, and B is a hydrogen atom or $\text{—}R^1\text{-}A$. In this regard, $X^1$ may be a $C_1\text{-}C_{18}$ alkyl or an aryl group, and $X^2$ may be a $C_1\text{-}C_6$ alkoxy group, a $C_5\text{-}C_7$ cycloalkoxy group or a phenoxy group. If the number of carbon atoms is not within the range described above, it is difficult to remove alcohol by simple reduction of pressure. In addition, $R^1$ may be a $C_1\text{-}C_{18}$ alkylene or cyclic hydrocarbon. In case of alkylene or cyclic hydrocarbon having more than 18 carbon atoms it is difficult to manufacture organic silanepolyol, and also the process time may increase. In addition, if n is greater than 8, it is difficult to be manufactured by using methods commonly used in the art.

A hydrolysis rate of the organic silane compound may be 80% or greater, preferably in the range of 80 to 99.9%, and more preferably in the range of 90 to 99.9%. The hydrolysis rate is calculated by Equation 1 below using areas of the alkoxy group of the alkoxy silane compound in a $^1$H NMR spectrum before and after hydrolysis.

$$\left(1 - \frac{\text{area of alkoxy group of alkoxy silane compound in } 1H\ NMR \text{ spectrum after hydrolysis}}{\text{area of alkoxy group of alkoxy silane compound in } 1H\ NMR \text{ spectrum before hydrolysis}}\right) \times 100\% = \text{hydrolysis rate of alkoxy silane (\%)} \quad \text{Equation 1}$$

In addition, in the organic silanepolyol obtained by hydrolyzing the organic alkoxy silane compound, a production rate of silanol (Si—OH) may be 40% or greater, and preferably in the range of 40 to 95%. Specifically, when the hydrolysis rate of the organic alkoxy silane is 98% or greater, the production rate of silanol is 63% or greater, but the present invention is not limited thereto. In this regard, the production rate of silanol may be calculated by Equation 2 below using measured area and theoretical area of silanol in $^1$H NMR spectrum after hydrolysis of the organic alkoxy silane compound. The silanol forms a film on the surface of an inorganic filler by hydrogen bond and a M-O—Si covalent bond with a hydroxyl group (M-OH) of the surface of the inorganic filler by condensation using heat-treatment, thereby serving as a functional group.

$$\frac{\text{measured area of silanol in } 1H\ NMR \text{ spectrum after hydrolysis of alkoxy silane compound}}{\text{theoretical area of silanol in } 1H\ NMR \text{ spectrum after hydrolysis of alkoxysilane compound}} \times 100\% = \text{production rate of silanol (\%)} \quad \text{Equation 2}$$

The organic silanepolyol may include at least one selected from the group consisting of mercaptoalkyl($C_1\text{-}C_{18}$)silanepolyol or bis[polyhydroxysilylalkyl($C_1\text{-}C_{18}$)]polysulfide. The organic silanepolyol may also include cycloalkylsilanepolyol to provide hydrophobicity.

The mercaptoalkyl($C_1\text{-}C_{18}$)silanepolyol may include at least one selected from the group consisting of mercaptoalkyl ($C_1\text{-}C_{18}$)silanetriol and its condensation dimer, 1,3-bis[mercaptoalkyl($C_1\text{-}C_{18}$)]-1,1,3,3-tetrahydroxydisiloxane. The mercaptoalkyl($C_1\text{-}C_{18}$)silanepolyol may further include a siloxane oligomer. In addition, as the organic silanepolyol, bis[polyhydroxysilylalkyl($C_1\text{-}C_{18}$)]polysulfide, may be represented by Formula 3 below.

$$[(O_{3/2})_{3-m}(HO)_l Si]\text{—}R_1\text{—}S_n\text{—}C \quad \text{Formula 3}$$

In Formula 3, $R^1$ is a $C_1\text{-}C_{18}$ alkylene or cyclic hydrocarbon, n is an integer from 1 to 8, C is a hydrogen atom or $\text{—}R^1\text{—Si(OH)}_l(O_{3/2})_{3-m}]$, and m and l are each independently an integer respectively satisfying $1 \leq m \leq 3$ and $1 \leq l \leq 3$.

The cycloalkylsilanepolyol that provides hydrophobicity to the organic silanepolyol may be represented by Formula 2 below.

$$R^2R^3Si(OH)_2 \quad \text{Formula 2}$$

In Formula 2, $R^2$ is a $C_5$-$C_{12}$ cyclic saturated alkyl group or aryl group, wherein the cyclic saturated alkyl group may be substituted with a $C_1$-$C_{12}$ alkyl group, and $R^3$ is —OH or —OSiR$^2$(OH)$_2$.

In addition, the cycloalkylsilanepolyol represented by Formula 2 may be a ($C_5$-$C_{12}$ cycloalkyl)silanepolyol, and preferably cyclopentylsilanetriol, cyclohexylsilanetriol, 1,3-bis(cyclopentyl)-1,1,3,3-tetrahydroxydixiloxane or 1,3-bis(cyclohexyl)-1,1,3,3-tetrahydroxydixiloxane.

The inorganic particles may include at least one selected from the group consisting of silica, mica, talc, titanium oxide, zirconium oxide, tin oxide, iron oxide, and zinc oxide, and preferably at least one selected from the group consisting of silica and mica, but are not limited thereto. In addition, the inorganic particles may have an average diameter ranging from 5 nm to 100 μm. In this regard, if the average diameter of the inorganic particles is less than 5 nm, the manufacturing costs are too high. On the other hand, if the average diameter is greater than 100 μm, performance of elastomer, as a reinforcing filler, may be reduced. The inorganic particles may have a BET surface area ranging from 50 to 1,000 m$^2$/g. In addition, the silica may include at least one selected from the group consisting of precipitated silica and colloidal silica, and preferably at least one selected from the group consisting of Zeosil (Rhodia Silica Co., Ltd.), Hi-Sil (PPG industries) and VN (Evonik Industries AG). The precipitated silica may be prepared using well-known methods in the art, for example, using a sodium silicate solution by acid precipitation.

Hereinafter, methods of preparing a functional reinforcing filler according to the present invention will be described in more detail.

Preparation Methods

The functional reinforcing filler according to the present invention including inorganic particles having a surface modified by an organic silanepolyol obtained by hydrolyzing an organic alkoxy silane compound represented by Formula 1 below may be prepared using two methods. In this regard, the organic alkoxy silane compound, the organic silanepolyol and the inorganic particles are described above.

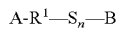  Formula 1

In Formula 1, A is —Si(X$^1$)$_2$X$^2$, —SiX$^1$(X$^2$)$_2$ or —SiX$^2$$_3$, wherein X$^1$ is a $C_1$-$C_{18}$ alkyl or an aryl group and X$^2$ is a $C_1$-$C_6$ alkoxy group, a $C_5$-$C_7$ cycloalkoxy group or a phenoxy group, R$^1$ is a $C_1$-$C_{18}$ alkylene or cyclic hydrocarbon, n is an integer from 1 to 8, and B is a hydrogen atom or —R$^1$-A.

Preparation Method 1

First of all, the functional reinforcing filler according to the present invention may be prepared by a method including: a first operation of preparing an organic silanepolyol-containing solution by hydrolyzing an organic alkoxy silane compound represented by Formula 1 below; a second operation of preparing a suspension by mixing the organic silanepolyol-containing solution and inorganic particles in the presence of at least one solvent selected from the group consisting of alcohol and water; a third operation of preparing inorganic particles coated with a molecular film by removing the alcohol and water from the suspension by evaporation; and a fourth operation of performing dehydration-condensation of the inorganic particles coated with the molecular film by heat-treatment.

In the first operation, the hydrolysis of the organic alkoxy silane compound is performed using an acid. The acid may be an organic acid that is easily evaporated or is not required to be neutralized. The organic acid may be carboxylic acid such as acetic acid, formic acid, butyric acid, palmitic acid, oxalic acid and tartaric acid; ascorbic acid; uric acid; or the like, but is not limited thereto. The hydrolysis of the organic alkoxy silane compound may be performed at a temperature ranging from 0 to 100° C., and preferably 25 to 80° C., but the temperature may vary according to types of reactants, e.g., an organic metal compound, an acid and a filler, and a solvent. In addition, the hydrolysis of the organic alkoxy silane compound may be performed at a pH ranging from 2.5 to 5.0. If the pH is less than 2.5, the generation of polysiloxane is promoted, and the production of silanol may be reduced. If the pH is greater than 5.0, the hydrolysis is too slowly performed.

In the third operation, while alcohol and water contained in the suspension are evaporated, a silanol group (Si—OH) of the organic silanepolyol binds to a hydroxyl group (M-OH) on the surface of the inorganic particles via hydrogen bond, so that the inorganic particles are coated with a molecular film. If the coated inorganic particles are heated, a M-O—Si covalent bond is formed by dehydration-condensation. Since the alcohol and water are removed by evaporation, a neutralization or filtration is not required. The alcohol may be a low boiling point alcohol.

In the fourth operation, the dehydration-condensation may be performed at 100° C. or higher and preferably at a temperature ranging from 100 to 150° C. and at a pressure ranging from 1 to 20 mmHg.

Preparation Method 2

The functional reinforcing filler according to the present invention may also be prepared by a method including preparing a suspension by mixing an organic alkoxy silane compound represented by Formula 1 below, inorganic particles and an alcohol aqueous solution at an acidic condition, removing alcohol and water from the suspension by evaporation, and performing dehydration-condensation of the inorganic particles by heat-treatment.

Preparation Methods 1 and 2 are different from each other, in that the surface of the inorganic particles is chemically modified while hydrolyzing the organic alkoxy silane compound into the organic silanepolyol according to Preparation Method 2. However, the Preparation Methods 1 and 2 are the same, in that 1) the dehydration-condensation of the coated inorganic particles is performed after alcohol and water are removed by evaporation, or the like, 2) the functional reinforcing filler does not emit alcohol and 3) same components are used in the preparation of the functional reinforcing filler. According to Preparation Method 2, as in Preparation Method 1, while alcohol and water are evaporated, a silanol group (Si—OH) of the organic silanepolyol binds to a hydroxyl group (M-OH) on the surface of the inorganic particles via hydrogen bond. If the coated inorganic particles are heated, a M-O—Si covalent bond is formed by dehydration-condensation. Since the alcohol and water are removed by evaporation, a neutralization or filtration is not required. The alcohol may be a low boiling point alcohol.

Preparation Method 2 will be described in more detail.

The amount of the organic alkoxy silane compound of Formula 1 may be in the range of 1 to 20 parts by weight, preferably 3 to 15 parts by weight, and more preferably 5 to 15 parts by weight based on 100 parts by weight of the inorganic particles.

The pH of the acidic condition may be in the range of 2.5 to 5.0. In this acidic condition, the organic alkoxy silane compound is hydrolyzed into organic silanepolyol. In this regard, if the pH is less than 2.5, the generation of polysiloxane is promoted, and the production of silanol may be reduced. If the pH is greater than 5.0, the hydrolysis is too slowly performed. For this acidic condition, an organic acid that is easily evaporated or is not required to be neutralized may be used.

The organic acid may be carboxylic acid such as acetic acid, formic acid, butyric acid, palmitic acid, oxalic acid and tartaric acid; ascorbic acid; uric acid; or the like, but is not limited thereto.

Since the functional reinforcing filler according to the present invention does not emit alcohol, volatile organic compounds (VOCs) are not emitted therefrom. In addition, the functional reinforcing filler according to the present invention includes 0.1 wt % or greater, preferably 0.1 to 20 wt % of carbon and 0.1 to 20 wt % of sulfur based on the total weight of the functional reinforcing filler.

Hereinafter, a rubber composition including the functional reinforcing filler according to the present invention will be described.

Rubber Composition

The present invention provides a rubber composition including the functional reinforcing filler. Specifically, the rubber composition according to the present invention includes an elastomer, the functional reinforcing filler, and at least one additive selected from the group consisting of a promoter and a retarder.

In the rubber composition, the amount of the functional reinforcing filler may be in the range of 10 to 200 phr, and preferably 20 to 150 phr based on 100 phr of the elastomer.

The elastomer is a thermoplastic or thermosetting elastomer, and may include at least one selected from the group consisting of a homopolymer including a conjugated diene monomer; and a copolymer including a conjugated diene monomer, a monovinyl aromatic monomer and a triene copolymer.

The elastomer may further include an organic rubber, wherein the organic rubber may include at least one selected from the group consisting of: natural rubber (formed by homopolymerization of butadiene and its homologues and derivatives); 1,4-polyisoprene, 3,4-polyisoprene, trans-1,4-polybutadiene, cis-1,4-polybutadiene or 1,2-polybutadiene; at least one copolymerizable monomer including butadiene and its homologues and derivatives and an ethylenically unsaturated compound; a butadiene-styrene copolymer using a butadiene isomer (styrene-butadiene rubber (SBR)); terpolymer of isoprene, styrene and butadiene polymer and their isomers; an acrylonitrile copolymer and terpolymer rubber composition; and isobutylene rubber.

In addition, the elastomer may further include alkyd resin, natural oil, oil-modified alkyl resin, nylon, epoxide, thermoplastic polyester, unsaturated polyester, polycarbonate, or the like. Preferably, the elastomer may further include polyethylene, polypropylene, polybutylene, polystyrene, ethylene propylene copolymer or terpolymer, polyoxymethylene and its copolymer, polyurethane, nitrocellulose, phenol resin, polysulfide rubber, vinyl butylate, vinyl chloride and vinyl acetate including a polymer, cellulose acetate and butyrate, viscose rayon, cellulose, ethylene copolymer, wax, Shellac, organic rubber, or the like. However, the present invention is not limited thereto.

The method of preparing the rubber composition using the functional reinforcing filler according to the present invention will be described. However, the present invention is not limited thereto.

A vulcanization rubber composition may be prepared using a method including: preparing a vulcanization elastomer composition by mixing a curable elastomer, the functional reinforcing filler, a promoter and a retarder; and curing the vulcanization elastomer composition by adding a curing agent thereto. A vulcanized rubber may be prepared using the vulcanization rubber composition.

The promoter, as an additive, may include at least one selected from the group consisting of benzothiazole, benzothiazole sulfenamide, dithiocarbamate, thiopholine, thiourea, xanthate, thiuram sulfide, amine and dithiophosphate. Specifically, the promoter may include at least one selected from the group consisting of:

benzothiazole including at least one selected from the group consisting of 2-mercaptobenzothiazole, zinc 2-mercaptobenzothiazole, 2,2'-dithiobisbenzothiazole, 2-morpholinothiobenzothiazole, 2-(4-morpholinodithio)benzothiazole, 2-(4-morpholinothio)benzothiazole, 2-(4-morpholinothio)-5-methylbenzothiazole, 2-(4-morpholinothio)-5-chlorobenzothiazole, 2-(2,6-dimethyl-4-morpholinothio)-benzothiazole, 2-(3,6-dimethyl-4-morpholinothio)benzothiazole, 2,2'-dibenzothiazole disulfide and 2-mercaptobenzothiazyl disulfide;

benzothiazole sulfonamide including at least one selected from the group consisting of N-cyclohexyl-2-benzothiazole sulfenamide, N,N'-dicyclohexyl-2-benzothiazole sulfenamide, N,N-diethyl-2-benzothiazole sulfenamide, N-t-butyl-2-benzothiazole sulfenamide, N,N-diisopropyl-2-benzothiazole sulfenamide, N-oxydiethylene-2-benzothiazole sulfenamide and N-oxydiethylene thiocarbamyl-N-oxydiethylene sulfenamide;

dithiocarbamate including at least one selected from the group consisting of cadmium diethyldithiocarbamate, lead diamyldithiocarbamate, lead dimethyldithiocarbamate, zinc dimethyldithiocarbamate, zinc diethyldithiocarbamate, zinc diamyldithiocarbamate, zinc di-n-butyldithiocarbamate, zinc dimethylpentamethylenedithiocarbamate, bismuth dimethyldithiocarbamate, copper dimethyldithiocarbamate, selenium diethyldithiocarbamate, selenium dimethyldithiocarbamate, tellurium diethyldithiocarbamate, piperidinium pentamethylenedithiocarbamate, 2-benzothiazole-N,N-diethyldithiocarbamate and dimethylammonium dimethyldithiocarbamate;

thiopholine including at least one selected from the group consisting of 4-mercaptomorpholine, 4-mercapto-2,6-dimethylmorpholine, 4,4'-dithiomorpholine, 4-[(4-morpholinylthio)thixomethyl]morpholine, 2,6-dimethylmorpholine disulfide, methylmorpholine disulfide, propyl 2,6-dimethyl morpholine disulfide, alkyl morpholine disulfide and phenyl morpholine disulfide;

thiourea including at least one selected from the group consisting of trimethylthiourea, 1,3-dibutylthiourea, N,N'-dibutylthiourea, 1,3-diethylthiourea, dimethylethylthiourea, diphenylthiourea and tetramethylthiourea;

xanthate including at least one selected from the group consisting of sodium isopropylxanthate, zinc isopropylxanthate and zinc dibutylxanthate;

thiuram sulfide including at least one selected from the group consisting of tetramethylthiuram monosulfide, tetramethylthiuram disulfide, tetraethylthiuram disulfide, tetrabutylthiuram disulfide, dipentamethylenethiuram tetrasulfide, tetrabenzylthiuram disulfide, dimethyldiphenylthiuram disulfide and dipentamethylenethiuram monosulfide;

amine including at least one selected from the group consisting of cyclohexylethylamine, dibutylamine, heptaldehyde-aniline condensate, acetaldehyde-aniline condensate and guanidine, for example, N,N'-diphenylguanidine, N,N'-di-o-tolylguanidine, o-tolylbiguanidine, N,N',N'''-triphenylguanidine and diarylguanidine; and dithiophosphate.

In addition, the retarder, as an additive, may include at least one selected from the group consisting of N-(cyclohexylthio) phthalimide, phthalic acid anhydride, benzoic acid, salicylic acid, stearic acid, N-nitrosodiphenylamine, sodium acetate, aromatic sulfonamide, dioctyl phthalate and magnesium oxide. Preferably, the retarder may include at least one selected from the group consisting of N-(cyclohexylthio)phthalimide, phthalic acid anhydride and aromatic sulfonamide.

Rubber prepared using the rubber composition including the functional reinforcing filler according to the present invention may have low delta G' and low tan δ at 60° C. The functional reinforcing filler according to the present invention may also improve processability and physical properties of the rubber. The rubber prepared using the functional reinforcing filler according to the present invention has a scorch time of greater than 3 minutes, and a cure time of less than 30 minutes (ASTM D5289-95) with the compounded product having a 300% modulus of at least 7.5 MPa (ASTM D412-98a). The functional reinforcing filler according to the present invention may be applied to a variety of rubber products, for example, automotive drive-belts, engine mounts, V-belts, conveyor belts, roller coatings, tires, components of tires, disulfide (TESPD) and bis(trimethoxysilylpropyl)disulfide (TMSPD) were used as the organic alkoxy silane compound. Organic silanepolyols were prepared by varying the reaction time, temperature, and the amount of a catalyst, and hydrolysis rate and production rate of silanol were calculated using Equations 1 and 2. Acetic acid was used as a catalyst to promote the hydrolysis, and the amount of the catalyst is shown in Table 1 below. The RT in Table 1 indicates room temperature (25° C.). The hydrolysis rate was calculated by Equation 1, and the production rate of silanol was calculated by Equation 2.

TABLE 1

| Synthesis Example | Organic alkoxy silane compound | Reaction time (min) | Temperature | Amount of catalyst (wt %) | Hydrolysis rate | Production rate of silanol |
|---|---|---|---|---|---|---|
| 1 | MPTMS | 20 min | RT | 0.5 | 89% | 70% |
| 2 | MPTMS | 60 min | RT | 0.5 | 95% | 71% |
| 3 | MPTMS | 120 min | RT | 0.5 | 96% | 72% |
| 4 | MPTMS | 10 min | RT | 1.0 | 92% | 77% |
| 5 | MPTMS | 20 min | RT | 1.0 | 98% | 79% |
| 6 | MPTMS | 60 min | RT | 1.0 | 99% | 75% |
| 7 | MPTMS | 20 min | RT | 2.0 | 99% | 68% |
| 8 | MPTMS | 10 min | 65° C. | 1.0 | 100% | 57% |
| 9 | MPTES | 60 min | 65° C. | 1.0 | 98% | 63% |
| 10 | MPTES | 60 min | 65° C. | 2.0 | 100% | 51% |
| 11 | TMSPT | 120 min | RT | 1.0 | 80% | 73% |
| 12 | TMSPT | 180 min | RT | 1.0 | 91% | 77% |
| 13 | TMSPT | 180 min | RT | 2.0 | 93% | 59% |
| 14 | TMSPT | 1 day | RT | 1.0 | 99% | 60% |
| 15 | TESPT | 1 day | RT | 2.0 | 62% | 45% |
| 16 | TESPT | 60 min | 65° C. | 1.0 | 95% | 53% |
| 17 | TESPT | 120 min | 65° C. | 1.0 | 99% | 57% |
| 18 | TESPT | 180 min | 65° C. | 1.0 | 100% | 54% |
| 19 | TESPT | 60 min | 65° C. | 2.0 | 99% | 53% |
| 20 | TESPT | 60 min | 78° C. | 1.0 | 99% | 50% |
| 21 | TMSPD | 1 day | RT | 1.0 | 99% | 56% |
| 22 | TESPD | 120 min | 65° C. | 1.0 | 98% | 55% | such as vehicle tire treads, subtreads, carcases, sidewalls, belt wedge, bead fillers and wire skim coat, show sole materials, packing rings, wire and cable sheath, hose, gasket, sealing materials, or the like, so that the rubber products may have excellent tensile properties and dynamic properties.

Hereinafter, the present invention will be described more specifically with reference to the following examples. However, the examples are not intended to limit the scope of the present invention.

EXAMPLES

Synthesis Examples 1 to 22

Preparation of Organic Silanepolyol 100 parts by weight of a 1% acetic acid aqueous solution based on 100 parts by weight of a sulfur-containing organic alkoxy silane compound was added to a container including the organic alkoxy silane compound. In this regard, 300 parts by weight of a low boiling point alcohol such as methanol and ethanol may be added thereto. Thus prepared solution was stirred until all of the alkoxy groups of the organic alkoxy silane compound are converted into hydroxyl groups so that the solution is transparent. Organic silanepolyol solutions were prepared according to Synthesis Examples 1 to 22 as shown in Table 1 below. 3-mercaptopropyltrimethoxysilane (MPTMS), 3-mercaptopropyltriethoxysilane (MPTES), bis (ysilylpropyl)tetrasulfide (TESPT), bis(triethoxysilylpropyl)

Referring to Synthesis Examples 1 to 22, it was identified that the hydrolysis rate of the organic alkoxy silane compound into the organic silanepolyol was highly maintained and the production rate of silanol was also highly maintained by controlling the hydrolysis conditions.

Preparation of Functional Reinforcing Filler Using Organic Silanepolyol Obtained by Hydrolyzing Organic Alkoxy Silane Compound Example 1

(1) Preparation of Mercaptopropylsilanepolyol 3.6 g of mercaptopropyltrimethoxysilane (MPTMS) was added to 3.6 g of a 1% acetic acid aqueous solution (about pH 3.5) in a 25 mL flask. The flask was stirred at room temperature for 20 minutes to prepare a transparent solution containing mercaptopropylsilanepolyol. In order to identify silanepolyol, the solvent was removed using a rotary vacuum evaporator, and the amount of the residual alkoxy group in a product was measured using $^1$H NMR spectrum. Then, hydrolysis rate and production rate of silanol (conversion rate of Si—OR into Si—OH) were calculated. Methoxy groups of mercaptopropyltrimethoxysilane were hydrolyzed into hydroxy groups. The hydrolysis rate was 98% hydrolysis rate, and the production rate of silanol calculated using $^1$H NMR spectrum of FIG. 1 and Equation 2 was 79% (2.37/3× 100%=79%). 3-mercaptopropylsilanetriol was mainly produced, and a small amount of 1,3-bis(3-mercaptopropyl)-1, 1,3,3-tetrahydroxydisiloxane and oligomers was produced by condensation of a part of silanol.

(2) Preparation of Functional Reinforcing Filler

The mercaptopropylsilanepolyol-containing solution prepared as described above was added to a slurry containing 60 g of silica (Z115GR of Rhodia Silica Co., Ltd.) and 150 g of methanol, and the mixture was stirred at room temperature for 10 minutes. Then, the solvent and volatile materials were evaporated using a rotary vacuum evaporator, and residual solid particles were treated in an oven at 130° C. for 6 hours to perform dehydration-condensation to prepare silica (functional reinforcing filler) having a surface modified by the mercaptopropyl group.

Example 2

Figure 2:
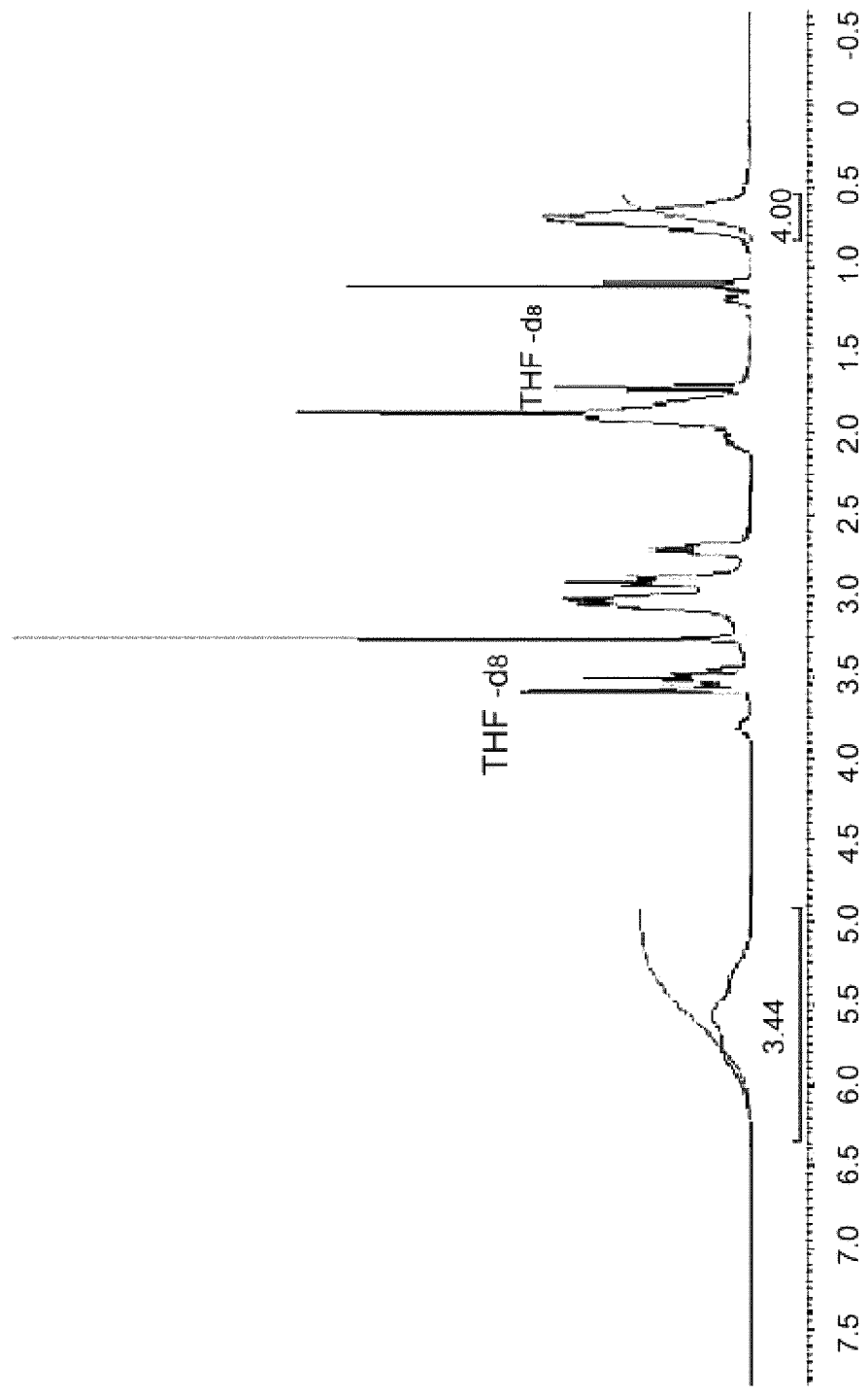
FIG. 2 shows $^1$H NMR spectrum of a solution containing bis(trihydroxysilylpropyl)tetrasulfide produced by hydrolyzing bis(triethoxysilylpropyl)tetrasulfide according to Example 2-(1)

(1) Preparation of Bis[polyhydroxysilylpropyl]tetrasulfide 4.8 g of bis(triethoxysilylpropyl)tetrasulfide (TESPT) was added to a mixture including 4.8 g of a 1% acetic acid aqueous solution (about pH 3.5) and 14.4 g of methanol in a 50 mL flask. The flask was refluxed in a nitrogen atmosphere for 2 hours to prepare a transparent solution containing bis(polyhydroxysilylpropyl)tetrasulfide. In order to identify organic silanepolyol, the volatile compounds such as methanol, water and acetic acid were removed using a rotary vacuum evaporator, and the amount of the residual alkoxy group in the product was measured using $^1$H NMR spectrum. Then, hydrolysis rate and production rate of silanol were calculated. Referring to $^1$H NMR spectrum, ethoxy groups of bis(triethoxysilylpropyl)tetrasulfide are hydrolyzed into hydroxyl groups. Thus, the hydrolysis rate was 99%, and the production rate of silanol was 57% (3.44/6×100%=57%). $^1$H NMR spectrum was shown in FIG. 2. The products were silanetriol and dimers, trimers and oligomers produced by condensation of a part of silanetriol.

(2) Preparation of Functional Reinforcing Filler

The bis[polyhydroxysilylpropyl]tetrasulfide-containing solution prepared as described above was added to a slurry containing 60 g of silica and 150 g of methanol, and the mixture was stirred at room temperature for 10 minutes. Then, the solvent and volatile materials were evaporated using a rotary vacuum evaporator, and residual solid particles were treated in an oven at 130° C. for 8 hours to perform dehydration-condensation to prepare silica (functional reinforcing filler) having a modified surface.

Simultaneous Preparation of Organic Silanepolyol and Functional Reinforcing Filler

Example 3

A suspension including 60 g of silica, 200 g of methanol, 4.8 g (8 parts by weight based on 100 parts by weight of silica) of bis(triethoxysilylpropyl)tetrasulfide, and 4.8 g of a 1% acetic acid aqueous solution was reflux-stirred for 2 hours. Then, volatile materials were evaporated using a rotary vacuum evaporator, and residual solid particles were treated in an oven at 130 for 8 hours to obtain silica (functional reinforcing filler) having a modified surface. Then, floating properties of the functional reinforcing filler in water were measured, and the results are shown in FIG. 3A.

Examples 4 to 5

Silica (functional reinforcing filler) having a modified surface was prepared according to Examples 4 and 5 in the same manner as in Example 3, except that 3 g (5 parts by weight) of bis(triethoxysilylpropyl)tetrasulfide and 6.6 g (11 parts by weight) of bis(triethoxysilylpropyl)tetrasulfide were respectively used in Examples 4 and 5. Then, floating properties of the functional reinforcing fillers in water were measured, and the results are shown in FIGS. 3B and 3C, respectively. The floating properties are measured to detect whether the surface of silica is modified to have hydrophobicity since water cannot penetrate into silica. Silica floats in water if the surface of silica is completely covered with an organic group.

Figure 3:
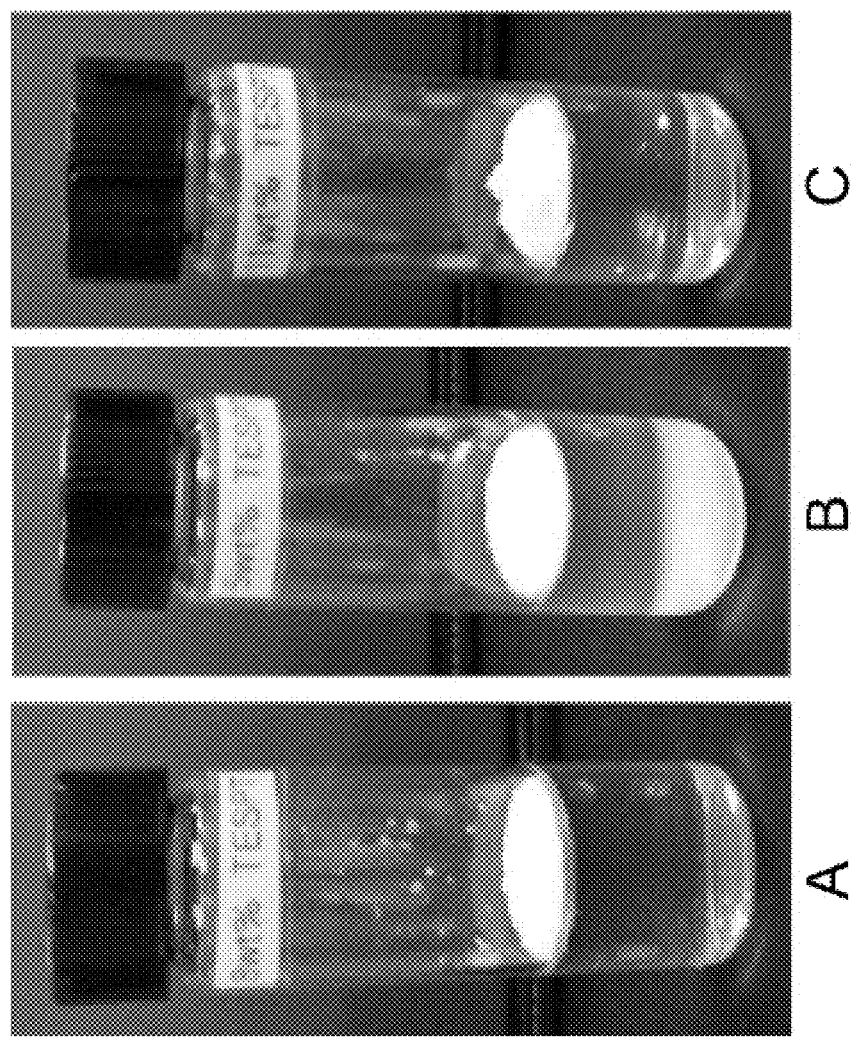
FIGS. 3A, 3B, and 3C are photographs of functional reinforcing fillers respectively prepared according to Examples 3 to 5 illustrating floating properties of the functional reinforcing fillers in water.

As shown in FIGS. 3A to 3C, the functional reinforcing fillers prepared according to Examples 3 to 5 had excellent floating properties. In particular, the functional reinforcing fillers prepared according to Examples 3 and 5 had more excellent floating properties. This indicates that a flawless organic layer was formed on the surface of silica by the organic silanepolyol.

Example 6

A suspension including 60 g of silica, 200 g of methanol, 3.6 g (6 parts by weight based on 100 parts by weight of silica) of mercaptopropyltrimethoxysilane, and 3.6 g of a 1% acetic acid aqueous solution was stirred at room temperature for 20 minute. Then, volatile materials were evaporated using a rotary vacuum evaporator, and residual solid particles were treated in an oven at 130° C. for 8 hours to obtain silica (functional reinforcing filler) having a modified surface.

Example 7

(1) Preparation of Cyclopentylsilanetriol (Cyclic Organic Silanepolyol)

Figure 4:
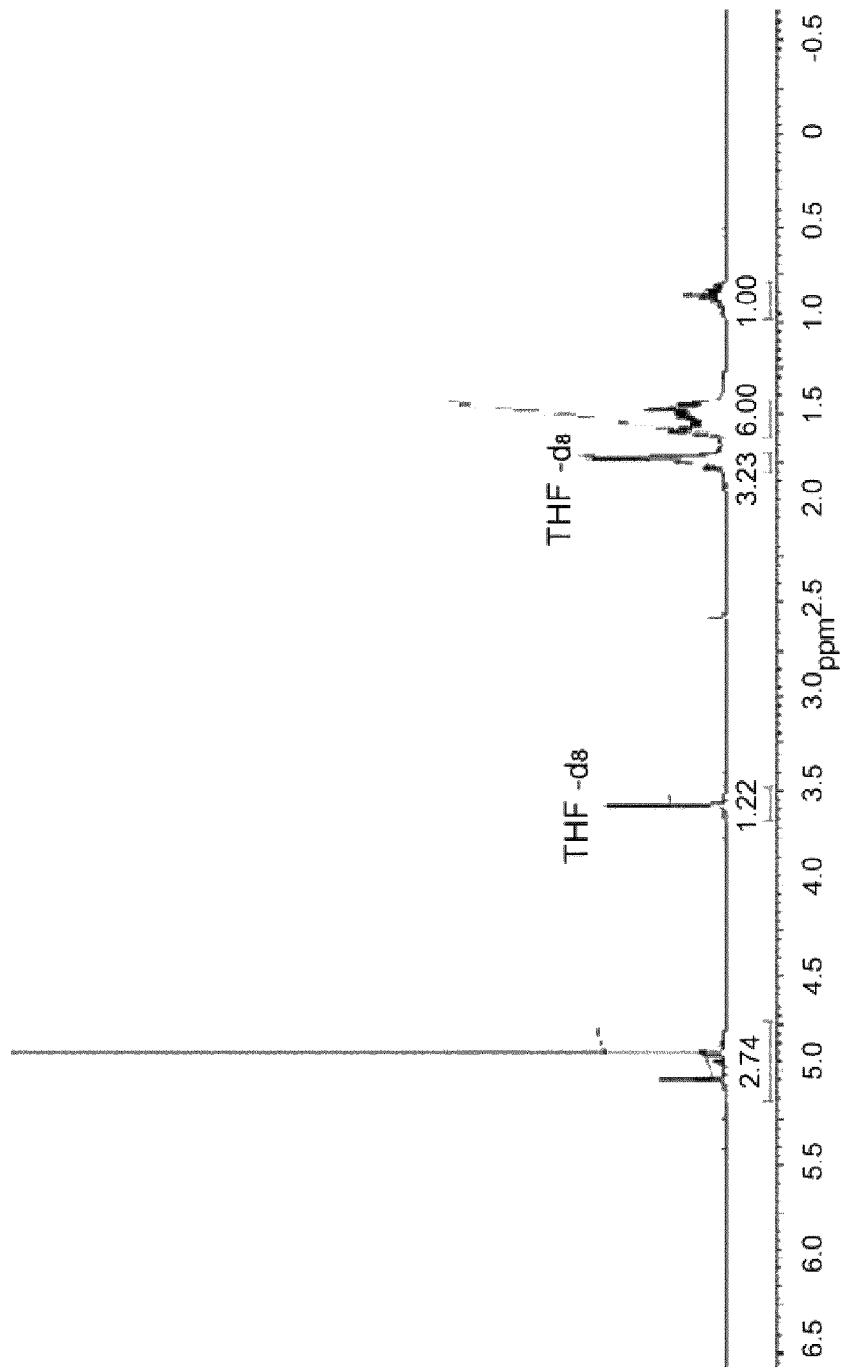
FIG. 4 shows $^1$H NMR spectrum of a solution containing cyclopentylsilanetriol produced by hydrolyzing cyclopentyltrimethoxysilane according to Example 7.

3.0 g of cyclopentyltrimethoxysilane was mixed with 3.0 g of 1% acetic acid aqueous solution, and the mixture was stirred at room temperature for 3 hours to prepare a transparent solution containing cyclopentylsilanepolyol. In order to identify methoxy groups remaining in cyclopentyltrimethoxysilane in $^1$H NMR spectrum, the solvent was completely removed using a rotary vacuum evaporator to obtain 2.2 g of white solid. Referring to the $^1$H NMR spectrum of FIG. 4, it was identified that methoxy groups were completely hydrolyzed, and the production rate of silanol was 91% (2.74/3× 100%=91%).

(2) Preparation of Functional Reinforcing Filler Using Mercaptopropylsilanepolyol and Cyclopentylsilanetriol The mercaptopropylsilanetriol-containing solution prepared according to Example 1-(1) was mixed with the cyclopentylsilanetriol-containing solution prepared according to Example 7-(1). The mixture was added to a suspension including 60 g of silica and 200 g of methanol, and the resultant was stirred at room temperature for 10 minutes. Then, volatile materials were evaporated using a rotary vacuum evaporator, and residual solid phase was heat-treated in an oven at 130° C. for 6 hours to prepare a functional reinforcing filler having a surface modified by the mercaptopropyl group and the cyclopentyl group and having excellent hydrophobicity.

Example 8

(1) Preparation of Bis(polyhydroxysilylpropyl)tetrasulfide

A suspension (about pH 3.5) including 60 g of silica, 200 g of methanol, 3.0 g (5 parts by weight based on 100 parts by weight of silica) of bis(triethoxysilylpropyl)tetrasulfide, and 3.0 g of a 1% acetic acid aqueous solution was prepared. The suspension was hydrolyzed in a reflux device for 2 hours to prepare a silica suspension including bis(polyhydroxysilylpropyl)tetrasulfide.

Figure 5:
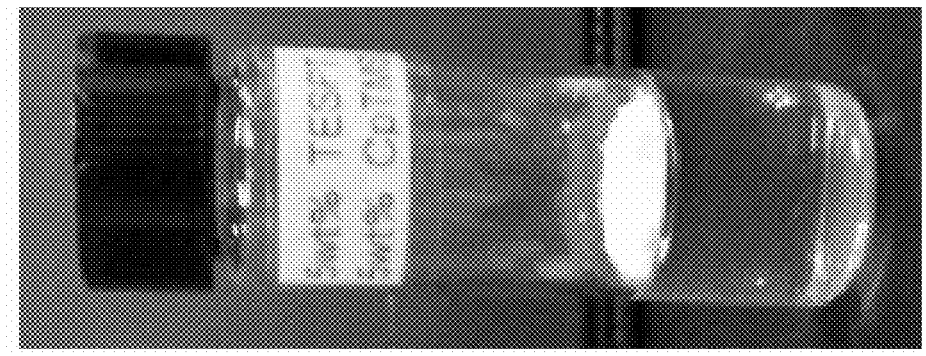
FIG. 5 is a photograph of a functional reinforcing filler prepared according to Example 8 illustrating floating properties of the functional reinforcing filler in water.

(2) Preparation of Functional Reinforcing Filler Using Solution Including Cyclic Organic Silanepolyol The cyclopentylsilanepolyol-containing solution prepared in the same manner as in Example 7-(1) was mixed with the bis(polyhydroxysilylpropyl)tetrasulfide-containing silica suspension prepared according to Example 8-(1), and the mixture was stirred. Then, volatile materials were removed using a rotary vacuum evaporator, and residual solid particles were heat-treated in an oven at 130 for 5 hours to prepare silica (functional reinforcing filler) having a modified surface. Then, floating properties of the prepared functional reinforcing filler in water were measured, and the results are shown in FIG. 5. Referring to FIG. 5, the functional reinforcing filler prepared according to Example 8 had excellent floating properties. This indicates that a flawless organic layer is formed on the surface of silica by organic silanepolyol. It was identified that the surface of hydrophilic silica had excellent hydrophobicity by modifying the surface with 5 parts by weight of bis(triethoxysilylpropyl)tetrasulfide and 5 parts by weight of cyclopentyltrimethoxysilane.

Preparation of Rubber Specimen Using Functional Reinforcing Filler

Preparation Examples

Standard Mixing Protocol

Test specimens of rubber compositions including silica prepared according to Examples 1 to 8 were prepared based on a standard mixing protocol shown in Table 2 below. Components were mixed using a HAAKE mixer (Model No. Rheocord 9000) at 140° C. for the preparation of the test specimens.

TABLE 2

| | Amount (phr) | Adding time (min) | Rotor speed (rpm) |
|---|---|---|---|
| First pass | | | |
| SSBR[1] | 100 | — | 60 |
| BR[2] | 30 | — | |
| Filler | 70 | 2 | |
| Zinc oxide[3] | 3 | 0.5 | |
| Stearic acid[4] | 2 | 0.5 | |
| Wax[5] | 2 | 0.5 | |
| 3C[6] | 3 | 0.5 | |
| Sweep | | 3 | |
| Second pass | | | |
| Products of first pass | all | 7 | 15.3 |
| Sulfur[7] | 1.7 | | |
| CZ[8] | 2 | | |
| DPG[9] | 0.6 | | |

[1]SSBR: Solution Styrene-Butadiene-Rubber, Sol6450SL of Kumho Petrochemical Co., Ltd.
[2]BR: Butadiene-Rubber, KBR-01 of Kumho Petrochemical Co., Ltd
[3]Zinc Oxide: ZnO#2 of Hanil Zinc Oxide Industrial Co., Ltd.
[4]Stearic acid: STAcid of LG Chemicals Co., Ltd.
[5]Wax: P-Wax of Nippon Seiro Co., Ltd.
[6]N-isopropyl-N'-Phenylene-diamine: 3C of Samwon Co., Ltd.
[7]Sulfur: SP-325 of Miwon Commercial Co., Ltd.
[8]CZ: N-Cyclohexylbenzothoazylsulfenamide: SAMACCZ of Samwon Co., Ltd.
[9]DPG: Diphenylguanidine Preparation Example 1

A rubber specimen was prepared using the functional reinforcing filler prepared according to Example 1 based on the standard mixing protocol of Table 2, and the composition of the rubber specimen is shown in Table 3 below.

Preparation Example 2

A rubber specimen was prepared using the functional reinforcing filler prepared according to Example 2 based on the standard mixing protocol of Table 2, and the composition of the rubber specimen is shown in Table 3 below.

Preparation Examples 3 to 8

Rubber specimens were prepared respectively using the functional reinforcing fillers prepared according to Examples 3 to 8 based on the standard mixing protocol of Table 2, and the compositions of the rubber specimens are shown in Table 3 below.

Comparative Preparation Example 1

A rubber specimen was prepared by mixing TEPST as an organic alkoxy silane compound and silica having a surface that is not treated using a mixer at 140°, and the composition of the rubber is shown in Table 3 below.

TABLE 3

| | | Preparation Examples 1 to 8 (phr) | Comparative Preparation Example 1 (phr) |
|---|---|---|---|
| Filler | SSBR | 100 | 100 |
| | BR | 30 | 30 |
| | Functional reinforcing filler | 70 | — |
| | Silica[1] | — | 64.4 |
| | Si69[2] | — | 5.6 |
| Zinc oxide | | 3 | 3 |
| Stearic acid | | 2 | 2 |
| Wax | | 2 | 2 |
| 3C | | 3 | 3 |
| Sulfur | | 1.7 | 1.7 |
| CZ | | 2 | 2 |
| DPG | | 0.6 | 0.6 |

[1]Silica: Z115GR of Rhodia Silica Co., Ltd.
[2]Si69: bis(triethoxysilylpropyl)tetrasulfide (TESPT) of Evonik Industries AG Experimental Example 1

Physical properties of the rubber specimens prepared according to Preparation Examples 1 to 8 and Comparative Preparation Example 1 were measured under conditions shown in Table 4 below, and the results are shown in Table 5 below.

In Table 4, vulcanization time indicates that the rubber specimens were cured at a pressure of 2,000 lb/in$^2$ at 150° C. for T90 time, i.e., time during which 90% of vulcanization of the rubber specimens, additional 5 minutes according to ASTM D-2094. Physical properties of the rubber specimens were measured using test method A according to ASTM D412-98a, and extension rate and tensile stress were measured using LLOYD instruments (LRX Plus, Ametek, Inc.). The ts2 indicates scorch time.

TABLE 4

|  | Prep. Ex. 1 | Prep. Ex. 2 | Prep. Ex. 3 | Prep. Ex. 4 | Prep. Ex. 5 | Prep. Ex. 6 | Prep. Ex. 7 | Prep. Ex. 8 | Comp. Prep. Ex. 1 |
|---|---|---|---|---|---|---|---|---|---|
| Scorch time (ts2) | 1.6 | 9.6 | 9.7 | 12.6 | 7.0 | 1.6 | 1.3 | 8.4 | 7.5 |
| Min. torque | 12.2 | 7.5 | 7.7 | 11.0 | 8.7 | 12.2 | 14.7 | 7.9 | 6.7 |
| Max. torque | 40.1 | 38.3 | 38.4 | 40.0 | 35.3 | 40.1 | 45.1 | 42.0 | 36.5 |
| Vulcanization time (t90) | 7.0 | 15.0 | 14.9 | 19.1 | 10.6 | 4.4 | 5.5 | 12.0 | 13.1 |

TABLE 5

|  | Prep. Ex.1 | Prep. Ex. 2 | Prep. Ex. 3 | Prep. Ex. 4 | Prep. Ex. 5 | Prep. Ex. 6 | Prep. Ex. 7 | Prep. Ex. 8 | Comp. Prep. Ex. 1 |
|---|---|---|---|---|---|---|---|---|---|
| Hardness (Shore A) | 58 | 57 | 57 | 56 | 59 | 58 | 62 | 58 | 55 |
| 300% modulus (MPa) | 14.0 | 14.6 | 14.7 | 13.9 | 18.4 | 14.0 | — | 14.0 | 14.1 |
| Tensile strength (MPa) | 15.5 | 22.0 | 22.1 | 20.9 | 19.4 | 15.3 | 15.5 | 18.5 | 17.9 |
| Extension rate (%) | 322 | 428 | 435 | 477 | 316 | 322 | 297 | 409 | 378 |
| Tg (° C.) | −23.4 | −31.3 | −30.9 | −31.0 | −29.7 | −23.2 | −26.3 | −28.7 | −32.2 |
| Tanδ (−15° C.) | 0.396 | 0.392 | 0.389 | 0.373 | 0.393 | 0.401 | 0.432 | 0.408 | 0.337 |
| Tanδ (0° C.) | 0.220 | 0.180 | 0.188 | 0.197 | 0.179 | 0.222 | 0.200 | 0.192 | 0.152 |
| Tanδ (60° C.) | 0.047 | 0.028 | 0.025 | 0.039 | 0.029 | 0.048 | 0.040 | 0.038 | 0.038 |

Referring to the results of the physical properties shown in Table 5, the rubber specimens prepared according to Preparation Examples 1, 6, and 7 using silica having a surface modified by the mercapto group had higher Tan δ at 60° C., so that rolling resistance was reduced, and higher Tan δ at 0° C. and −15° C., so that wet traction and low temperature properties were improved when compared to that prepared according to Comparative Preparation Example 1. In addition, the rubber specimens prepared according to Preparation Examples 2, 3, 4, 5 and 8 using silica having a surface modified by TESPT had similar or lower Tan δ at 60° C. and higher Tan δ at 0° C. and −15° C. compared to that prepared according to Comparative Preparation Example 1, so that rolling resistance was reduced, but wet traction and low temperature properties were improved. In addition, the rubber specimens using the functional reinforcing filler according to the present invention prepared according to Preparation Examples 2, 3, 4, and 8 have excellent processibility due to long scorch time and excellent mechanical properties due to high tensile strength and extension rate when compared to the rubber specimen prepared according to Comparative Preparation Example 1. Based on the results of Experimental Example 1, it was identified that the rubber specimens according to the present invention prepared according to Preparation Examples 1 to 8 have better mechanical properties than the rubber specimen prepared according to Comparative Preparation Example 1.

Preparation Examples 9 to 16

Rubber specimens were prepared according to Preparation Examples 9 to 11 in the same manner as in Preparation Example 4, except that various amounts of the functional reinforcing filler prepared according to Example 4 were used as shown in Table 6 below.

Rubber specimens were prepared according to Preparation Examples 12 to 14 in the same manner as in Preparation Example 3, except that various amounts of the functional reinforcing filler prepared according to Example 3 were used as shown in Table 6 below.

Rubber specimens were prepared according to Preparation Examples 15 to 16 in the same manner as in Preparation Example 5, except that various amounts of the functional reinforcing filler prepared according to Example 5 were used as shown in Table 6 below.

The physical properties of the rubber specimens are shown in Table 7 below.

TABLE 6

|  | Preparation Example | | | | | | | |
|---|---|---|---|---|---|---|---|---|
|  | 9 | 10 | 11 | 12 | 13 | 14 | 15 | 16 |
| Amount of functional reinforcing filler (phr) | 40 | 70 | 100 | 40 | 70 | 100 | 40 | 70 |
| Scorch time (ts2) | 15.8 | 12.6 | 5.8 | 12.3 | 9.7 | 5.4 | 9.7 | 7.0 |
| Minimum torque | 6.8 | 11.0 | 13.5 | 6.7 | 7.7 | 16.2 | 6.7 | 8.7 |
| Maximum torque | 33.5 | 40.0 | 42.4 | 34.0 | 38.4 | 48.7 | 33.6 | 35.3 |
| Vulcanization time (t90) | 20.2 | 19.1 | 18.7 | 16.1 | 14.9 | 13.7 | 13.1 | 10.6 |

TABLE 7

| | Preparation Example | | | | | | | |
|---|---|---|---|---|---|---|---|---|
| | 9 | 10 | 11 | 12 | 13 | 14 | 15 | 16 |
| Hardness (Shore A) | 45 | 56 | 64 | 48 | 57 | 68 | 49 | 59 |
| 300% modulus (MPa) | 10.1 | 13.9 | 15.0 | 12.2 | 14.7 | — | — | 18.4 |
| Tensile strength (T.S, MPa) | 8.3 | 20.9 | 21.3 | 9.5 | 22.1 | 22.2 | 8.3 | 19.4 |
| Extension rate (%) | 318 | 477 | 410 | 305 | 435 | 246 | 226 | 316 |

Referring to Table 7, as the amount of the functional reinforcing filler increases, tensile strength and modulus of the rubber specimens are improved.

Preparation Examples 17-1 to 17-11

In order to identify the effects of types of the promoter on the rubber prepared using the functional reinforcing filler according to the present invention, rubber specimens having compositions shown in Table 9 below were prepared using silica having a modified surface prepared according to Example 3, and then 300% modulus was tested in the same manner as in Experimental Example 1. The results are shown in Table 8 below.

TABLE 8

| | Preparation Example (phr) | | | | | | | | | | |
|---|---|---|---|---|---|---|---|---|---|---|---|
| | 17-1 | 17-2 | 17-3 | 17-4 | 17-5 | 17-6 | 17-7 | 17-8 | 17-9 | 17-10 | 17-11 |
| Antiozonant | 3.0 | 3.0 | 3.0 | 3.0 | 3.0 | 3.0 | 3.0 | 3.0 | 3.0 | 3.0 | 3.0 |
| Wax | 2.0 | 2.0 | 2.0 | 2.0 | 2.0 | 2.0 | 2.0 | 2.0 | 2.0 | 2.0 | 2.0 |
| Sulfur | 1.7 | 1.7 | 1.7 | 1.7 | 1.7 | 1.7 | 1.7 | 1.7 | 1.7 | 1.7 | 1.7 |
| DPG | 0.6 | 0.6 | 0.6 | 0.6 | 0.6 | 0.6 | 0.6 | 0.6 | 0.6 | 0.6 | 0.6 |
| CZ | 2.0 | — | — | 2.0 | 2.0 | 2.0 | 2.0 | 2.0 | 2.0 | 2.0 | 2.0 |
| TBBS[1] | — | 2.0 | — | — | — | — | — | — | — | — | — |
| MBT[2] | — | — | 2.0 | — | — | — | — | — | — | — | — |
| DOTG[3] | — | — | — | 0.5 | 2.0 | — | — | — | — | — | — |
| ZDMC[4] | — | — | — | — | — | 2.0 | — | — | — | — | — |
| ZDEC[5] | — | — | — | — | — | — | 2.0 | — | — | — | — |
| ZEPC[6] | — | — | — | — | — | — | — | 2.0 | — | — | — |
| ZBEC[7] | — | — | — | — | — | — | — | — | 2.0 | — | — |
| BDMDTC[8] | — | — | — | — | — | — | — | — | — | 2.0 | — |
| TDEDTC[9] | — | — | — | — | — | — | — | — | — | — | 2.0 |
| 300% modulus | 14.7 | 14.5 | 13.8 | 13.7 | 13.5 | 14.9 | 15.2 | 15.2 | 15.4 | 16.1 | 16.5 |

[1]TBBS: N-t-butyl-2-benzothiazole sulfenamide
[2]MBT: 2-mercaptobenzothiazole
[3]DOTG: di-o-tolylguanidine
[4]ZDMC: zinc-N-dimethyldithiocarbamate
[5]ZDEC: zinc diethyldithiocarbamate
[6]ZEPC: zinc ethylphenyldithiocarbamate
[7]ZBEC: zinc dibenzyldithiocarbamate
[8]BDMDTC: bismuth dimethyldithiocarbamate
[9]TDEDTC: tellurium diethyldithiocarbamate Referring to Table 8, the rubber prepared using a rubber composition including a promoter had an excellent 300% modulus of 10 or greater.

INDUSTRIAL APPLICABILITY

As identified described above, the rubber prepared using the functional reinforcing filler according to the present invention has excellent physical properties and does not emit volatile organic materials. The functional reinforcing filler according to the present invention may be applied to a variety of rubber products, for example, automotive drive-belts, engine mounts, V-belts, conveyor belts, roller coatings, tires, components of tires, such as vehicle tire treads, subtreads, carcases, sidewalls, belt wedge, bead fillers and wire skim coat, show sole materials, packing rings, wire and cable sheath, hose, gasket, sealing materials, or the like.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A functional reinforcing filler comprising inorganic particles having a surface modified by an organic silanepolyol obtained by hydrolyzing an organic silane compound represented by Formula 1 below;

$$A\text{-}R^1\text{—}S_n\text{—}B \qquad (1)$$

wherein A is $-Si(X^1)_2X^2$, $-SiX^1(X^2)_2$ or $-SiX^2_3$; wherein $X^1$ is a $C_1$-$C_{18}$ alkyl or an aryl group and $X^2$ is a $C_1$-$C_6$ alkoxy group, a $C_5$-$C_7$ cycloalkoxy group or a phenoxy group, $R^1$ is a $C_1$-$C_{18}$ alkylene or cyclic hydrocarbon, n is an integer from 1 to 8, and B is a hydrogen atom or $-R^1$-A, and the organic silanepolyol further comprises cycloalkylsilanepolyol represented by Formula 2 below;

$$R^2R^3Si(OH)_2 \qquad (2)$$

wherein $R^2$ is a $C_5$-$C_{12}$ cyclic saturated alkyl or aryl group, wherein the cyclic saturated alkyl group is substituted with a $C_1$-$C_{12}$ alkyl group, and $R^3$ is —OH or —OSiR$^2$(OH)$_2$.

2. The functional reinforcing filler of claim 1, wherein the organic silanepolyol comprises at least one selected from the group consisting of mercaptoalkyl($C_1$-$C_{18}$)polysilanepolyol and bis[polyhydroxysilylalkyl($C_1$-$C_{18}$)]polysulfide.

3. The functional reinforcing filler of claim 2, wherein the bis[polyhydroxysilylalkyl]polysulfide is represented by Formula 3 below;

$$[(O_{3/2})_{3-m}(HO)_l Si]—R^1—S_n—C \qquad (3)$$

wherein $R^1$ is a $C_1$-$C_{18}$ alkylene or cyclic hydrocarbon, n is an integer from 1 to 8, C is a hydrogen atom or $—R^1—Si(OH)_l(O_{3/2})_{3-m}$], and m and l are independently an integer respectively satisfying $1 \leq m \leq 3$ and $1 \leq l \leq 3$.

4. The functional reinforcing filler of claim 1, wherein the cycloalkylsilanepolyol represented by Formula 2 comprises at least one selected from the group consisting of cyclopentylsilanetriol, cyclohexanylsilanetriol, 1,3-dicyclopentyl-1,1,3,3-tetrahydroxydisiloxane and 1,3-dicyclohexyl-1,1,3,3-tetrahydroxydisiloxane.

5. The functional reinforcing filler of claim 1, wherein the inorganic particles comprise at least one selected from the group consisting of silica, mica, talc, titanium oxide, zirconium oxide, tin oxide, iron oxide, and zinc oxide and have an average diameter ranging from 5 nm to 100 μm.

6. The functional reinforcing filler of claim 1, wherein the inorganic particles have a BET surface area ranging from 50 to 1,000 m²/g.

7. The functional reinforcing filler of claim 1, wherein alcohol is not emitted from the functional reinforcing filler.

8. The functional reinforcing filler of claim 1, wherein the surface-modified inorganic particles comprise 0.1 to 20 wt % of sulfur based on the total weight of the inorganic particles.

9. A rubber composition comprising:
100 phr of an elastomer; and
10 to 200 phr of a functional reinforcing filler of claim 1.

10. The rubber composition of claim 9, further comprising at least one additive selected from the group consisting of a promoter and a retarder.

11. The rubber composition of claim 10, wherein the promoter comprises at least one selected from the group consisting of benzothiazole, benzothiazole sulfenamide, dithiocarbamate, thiopholine, thiourea, xanthate, thiuram sulfide, amine and dithiophosphate.

12. The rubber composition of claim 10, wherein the retarder comprises at least one selected from the group consisting of N-(cyclohexylthio)phthalimide, phthalic acid anhydride, benzoic acid, salicylic acid, stearic acid, N-nitrosodiphenylamine, sodium acetate, aromatic sulfonamide, dioctyl phthalate and magnesium oxide.

13. The rubber composition of claim 9, wherein the elastomer comprises at least one selected from the group consisting of a homopolymer comprising a conjugated diene monomer; and a copolymer comprising a conjugated diene monomer, a monovinyl aromatic monomer and a triene copolymer.

14. A tire prepared using the rubber composition of claim 9.

15. A method of preparing a functional reinforcing filler, the method comprising:
a first operation of preparing an organic silanepolyol-containing solution by hydrolyzing an organic silane compound represented by Formula 1 below;
a second operation of preparing a suspension by mixing the organic silanepolyol-containing solution and inorganic particles in the presence of at least one solvent selected from the group consisting of alcohol and water;
a third operation of preparing inorganic particles coated with a molecular film by removing the alcohol and water from the suspension by evaporation; and
a fourth operation of performing dehydration-condensation of the inorganic particles coated with the molecular film by heat-treatment, $$A-R^1—S_n—B \qquad (1)$$

wherein A is $—Si(X^1)_2 X^2$, $—SiX^1(X^2)_2$ or $—SiX^2_3$, wherein $X^1$ is a $C_1$-$C_{18}$ alkyl or an aryl group and $X^2$ is a $C_1$-$C_6$ alkoxy group, a $C_5$-$C_7$ cycloalkoxy group or a phenoxy group, $R^1$ is a $C_1$-$C_{18}$ alkylene or cyclic hydrocarbon, n is an integer from 1 to 8, and B is a hydrogen atom or $—R^1$-A.

16. The method of claim 15, wherein the hydrolysis is performed at a pH ranging from 2.5 to 5.0.

17. The method of claim 16, wherein the hydrolysis rate is in the range of 80 to 99.9%.

18. The method of claim 15, wherein the dehydration-condensation is performed at a temperature ranging from 100 to 150° C.

19. A method of preparing a functional reinforcing filler, the method comprising: preparing a suspension by mixing an organic silane compound represented by Formula 1 below, inorganic particles and an alcohol aqueous solution at a pH ranging from 2.5 to 5.0, removing alcohol and water from the suspension by evaporation, and performing dehydration-condensation to modify the surface of the inorganic particles by heat-treatment, $$A-R^1—S_n—B \qquad (1)$$

wherein A is $—Si(X^1)_2 X^2$, $—SiX^1(X^2)_2$ or $—SiX^2_3$, wherein $X^1$ is a $C_1$-$C_{18}$ alkyl or an aryl group and $X^2$ is a $C_1$-$C_6$ alkoxy group, a $C_5$-$C_7$ cycloalkoxy group or a phenoxy group, $R^1$ is a $C_1$-$C_{18}$ alkylene or cyclic hydrocarbon, n is an integer from 1 to 8, and B is a hydrogen atom or $—R^1$-A.

* * * * *